United States Patent

Tabet

[15] 3,673,484

[45] June 27, 1972

[54] REMOTE SERVO CONTROL CIRCUIT FOR REMOTE CONTROLLED SWITCHES AND SWITCHBOARDS

[72] Inventor: Michael A. Tabet, Norfolk, Va.

[73] Assignee: Tabet Manufacturing Co., Inc., Norfolk, Va.

[22] Filed: May 19, 1970

[21] Appl. No.: 38,823

[52] U.S. Cl. ..............................318/674, 318/685, 318/681

[51] Int. Cl. ........................................................G05b 11/14

[58] Field of Search ..................................318/674, 685, 681

[56] References Cited

UNITED STATES PATENTS

| | | | |
|---|---|---|---|
| 3,140,433 | 7/1964 | Stoffels | 318/674 X |
| 2,944,202 | 7/1960 | Bonaccorsi et al. | 318/674 X |
| 2,972,093 | 2/1961 | Silhavy | 318/674 X |
| 3,010,059 | 11/1961 | McLaughlin et al. | 318/674 X |
| 3,155,889 | 11/1964 | Stiles et al. | 318/674 X |
| 3,239,736 | 3/1966 | Gardberg | 318/674 X |

*Primary Examiner*—T. E. Lynch
*Attorney*—Sughrue, Rothwell, Mion, Zinn & Macpeak

[57] ABSTRACT

A unique remote control circuit is used to permit the automatic control of switches and switchboards from a remote location. The remote control circuit of this invention permits such control with only one low-power control wire per switch. The control circuit is a simple transistorized comparator circuit which drives a rotary solenoid which causes the controlled or slave switch to move to a position corresponding to the position of the control or master switch.

4 Claims, 5 Drawing Figures

INVENTOR.
MICHAEL A. TABET

BY Sughrue, Rothwell, Mion, Zinn & Macpeak
ATTORNEYS.

REMOTE SERVO CONTROL CIRCUIT FOR REMOTE CONTROLLED SWITCHES AND SWITCHBOARDS

BACKGROUND OF THE INVENTION

1. Field of the Invention

The field of invention is remote control circuits for controlling switches and switchboards from remote locations.

2. Description of the Prior Art

Devices are available which control switches from a remote location. However, such devices require the use of one wire per switch position or a plurality of wires, less than the number of switch positions which are connected between specially coded manual master and slave control sections. None of the prior devices utilize a single control wire per switch, connected through a simple control circuit, to effect the remote positioning of the control switches.

SUMMARY OF THE INVENTION

The invention relates to a remote control circuit which is coupled through a single control wire to a master switch and its associated slave switch to effect control of the slave switch from a remote location. Through the use of this invention, a plurality of master switches mounted on a switchboard and coupled to a single voltage divider may control a corresponding plurality of slave switches similarly coupled to another voltage divider.

With reference to FIG. 1, a plurality of control switches 2 are coupled to a single voltage divider 6; each step of a switch 2 being coupled to a different one of the taps of the voltage divider 6. The outputs from the master switches are taken at lines 3 and fed through isolation amplifiers 4 and lines 5 to comparator circuits 10. The slave switches 14 are coupled to voltage divider 16, each step of a switch 14 being coupled to a different tap of the voltage divider 16. The potentials at each step of the switches 14 are fed via lines 9 through isolation amplifiers 8 to second inputs of the comparators 10. The operation of the comparator is such that if there is a voltage difference between the input from its corresponding master switch 2 and the input from its corresponding slave switch 14, an output is realized on line 11. This output activates a driver 12 to cause the slave switch to rotate to the position corresponding to the position of the slave switch's corresponding master switch. In this manner, the slave switches 14 are slaved to the position of their corresponding master switches 2. A detailed description of the pertinent elements of the invention will be given below.

DETAILED DESCRIPTION OF THE PREFERRED EMBODIMENTS

Figure 1:
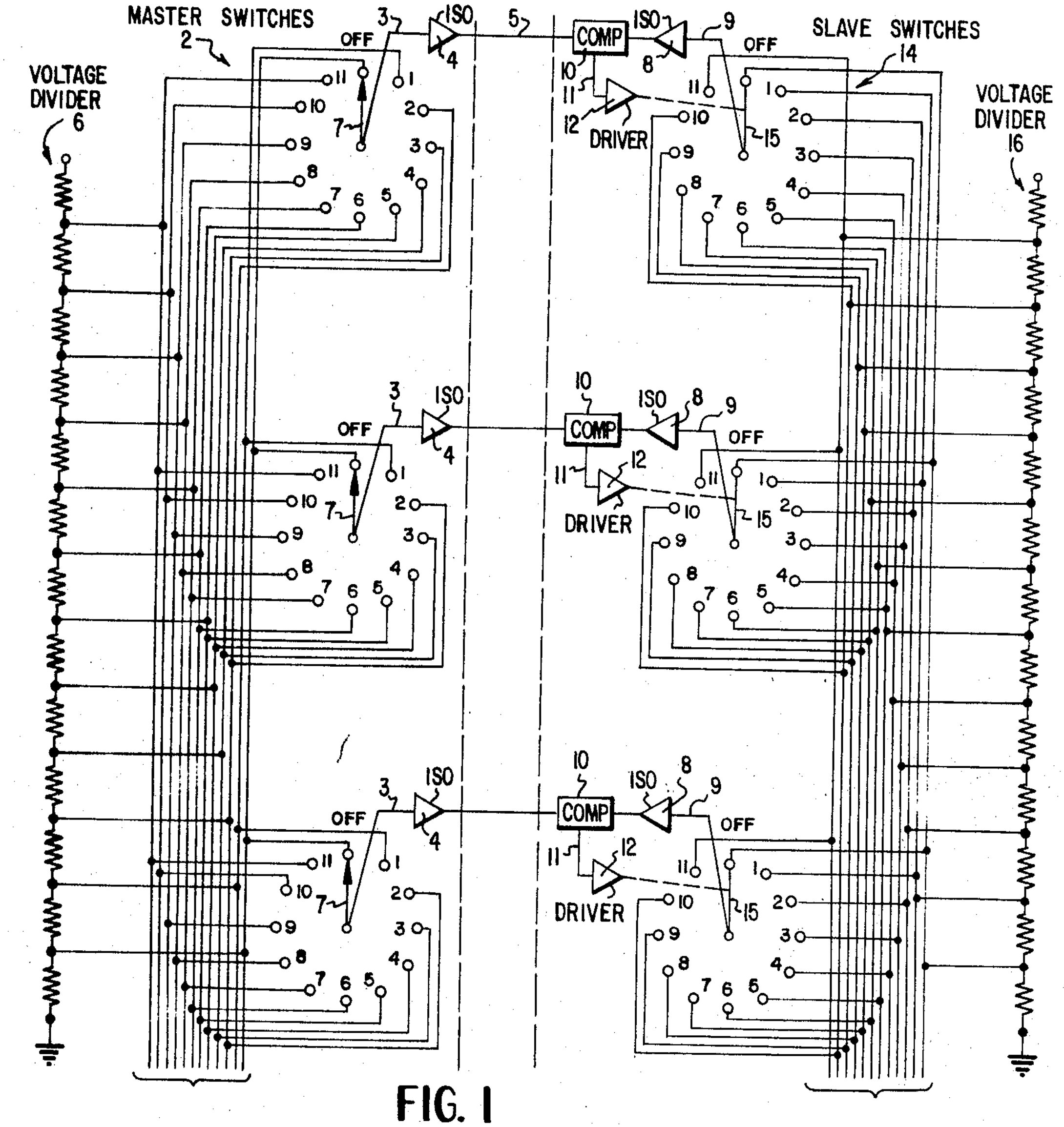
FIG. 1 is a schematic representation of a switchboard arrangement which may be used with this invention.

As described above, the invention is used with a switchboard arrangement comprising a plurality of pairs of master and slave switches. The master switches are coupled through the remote control circuitry of this invention to the corresponding plurality of slave switches. Since the operation of the circuit is identical for each pair of switches, i.e. each master switch and its corresponding slave switch, only a single pair will be described in detail. It is understood that the description which follows applies to every other pair of switches comprising the switchboard arrangement of FIG. 1.

Figure 2:
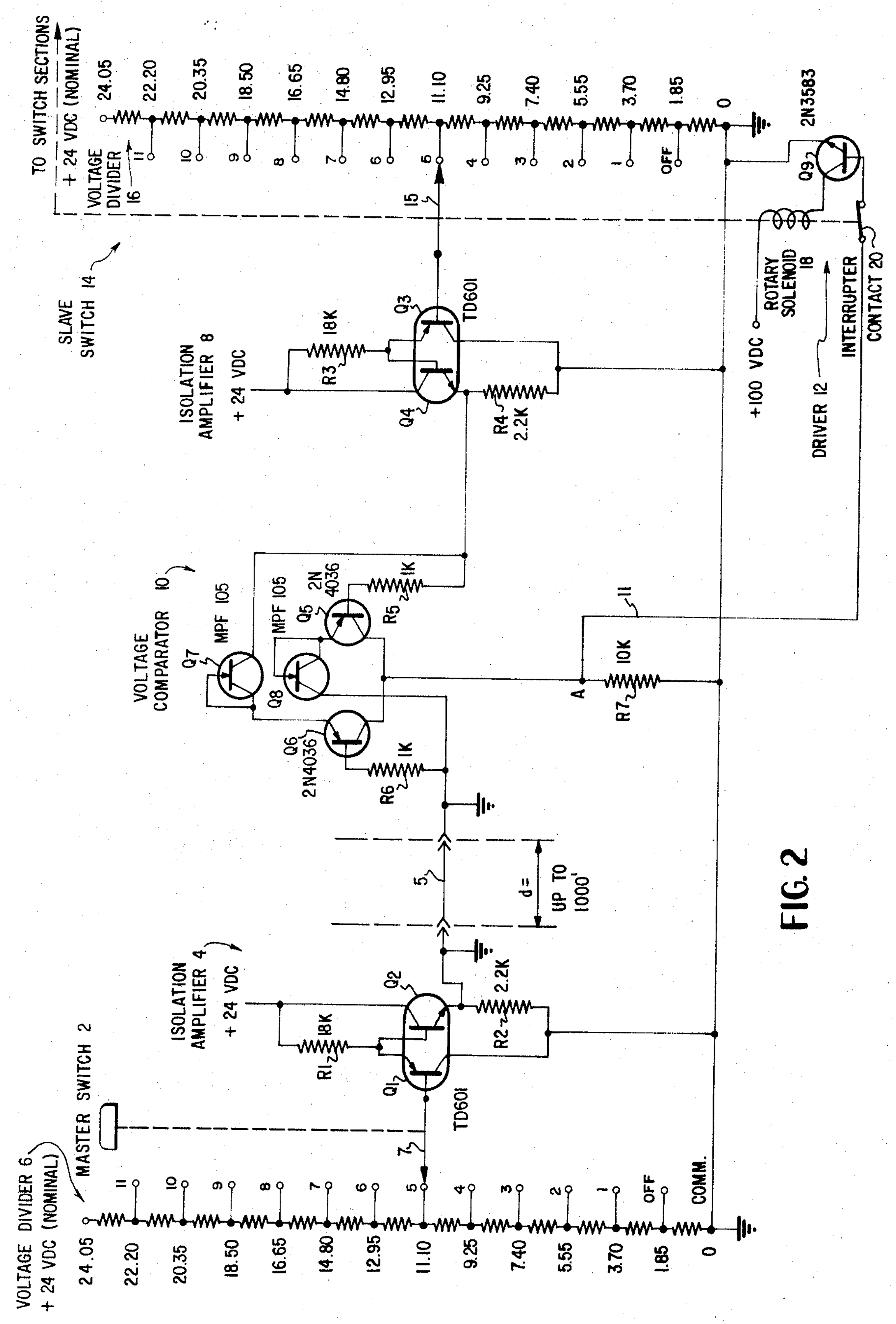
FIG. 2 shows a single master switch and its corresponding slave switch with a schematic diagram of the remote control circuitry necessary to accomplish this invention.

With reference to FIG. 2, the master or control side of the circuit comprises a voltage divider 6, a rotary master switch 2, and an isolation amplifier 4. The master switch may be any manually controlled stepping switch well known in the art. The voltage divider which is used with the preferred embodiment of this invention is a 24 volt DC (nominal) resistance voltage divider, consisting of 13 220 ohm resistors applied across a (24) volt DC potential. With this arrangement, the potential across each of the taps is equal to 1.85 volts. Though the invention will be described in relation to this voltage divider network and its 12 taps, it is understood that the invention may be used with a system requiring more or less than the 12 positions or with systems requiring different voltage divider networks.

Each of the taps from the voltage divider 6 is coupled to one of the fixed contacts of the 12-position master rotary switch 2. Selector contact 7 is manually rotated to the desired fixed contact on the switch 2. In FIG. 2 the selector is shown positioned in contact with fixed contact 5. In this position, selector 7 applies a potential of 11.10 volts to the input of isolation amplifier 4.

The isolation amplifier is necessary to provide a high impedance load on the voltage divider 6 and a low impedance source for the voltage comparator 10. Since one voltage divider can be used with more than one switch in a switchboard arrangement, it is imperative that the several remote control circuits connected to the voltage divider do not upset the predetermined voltage divider settings. With the circuitry of the preferred embodiment of the invention, the input impedance of the isolation amplifier is very high, approximately 12 megaohms, and is therefore of negligible effect when compared with the total voltage divider resistance of 2,860 ohms.

The isolation circuit is comprised of two complementary silicon transistors connected in a compound emitter follower circuit. The 18 K ohm resistor $R_1$ connected to the emitter of transistor $Q_1$ is used to set the operating point of the transistors to obtain a maximum gain. The 2.2K ohm resistor $R_2$ coupled to the emitter of $Q_2$ serves as a nominal load for the circuit when no external current is required. The output impedance of the isolation circuit is low and is satisfactory for driving the voltage comparator 10 placed at a distance as far as 1,000 feet from the master switch 2. To reduce the effect of noise on the circuit, it is recommended that for distances over 100 feet or in electrically noisy environments, the control line be shielded.

With reference to the slaved side of the circuit shown in FIG. 2, the voltage divider 16 associated with the slave switch is identical to the voltage divider 6 of the master side. As with voltage divider 6, divider 16 is tapped at 12 positions corresponding to the 12 fixed contacts of the slave switch 14. Selector contact 15 of switch 14 is used to couple the input to the isolation amplifier 8 to one of the fixed contacts of the switch 14.

Isolation amplifier 8 is identical to isolation amplifier 4 described above and operates in the manner described and will therefore not be described in detail.

The slave switch 14 is a solenoid activated forward drive rotary switch with an interrupter circuit which will be described in relation to the driver circuit 12 below.

Operation of the comparator 10 may best be described with reference to the specific examples which follow. In general, the two isolation amplifiers 4 and 8 present to the comparator voltages from the respective switches 2 and 14 at a low impedance. It is the function of the voltage comparator to determine whether these voltages are equal, and, if not, to develop an output which is applied to driver 12 to reposition the slave switch 14 until the voltages are equal. When the voltages are equal, the switches are in the same numerical position. In this manner, slave switch 14 always assumes the position directed by the master switch 2.

When contacts 7 and 15 are in the positions shown in FIG. 2, the voltage at the inputs to the comparator 10 are equal. Under this condition, transistors $Q_5$ and $Q_8$ are effectively cut off, thereby causing suhstantially no current to flow through resistor $R_7$. This in turn causes the potential at point A to be substantially 0.

Figure 3:
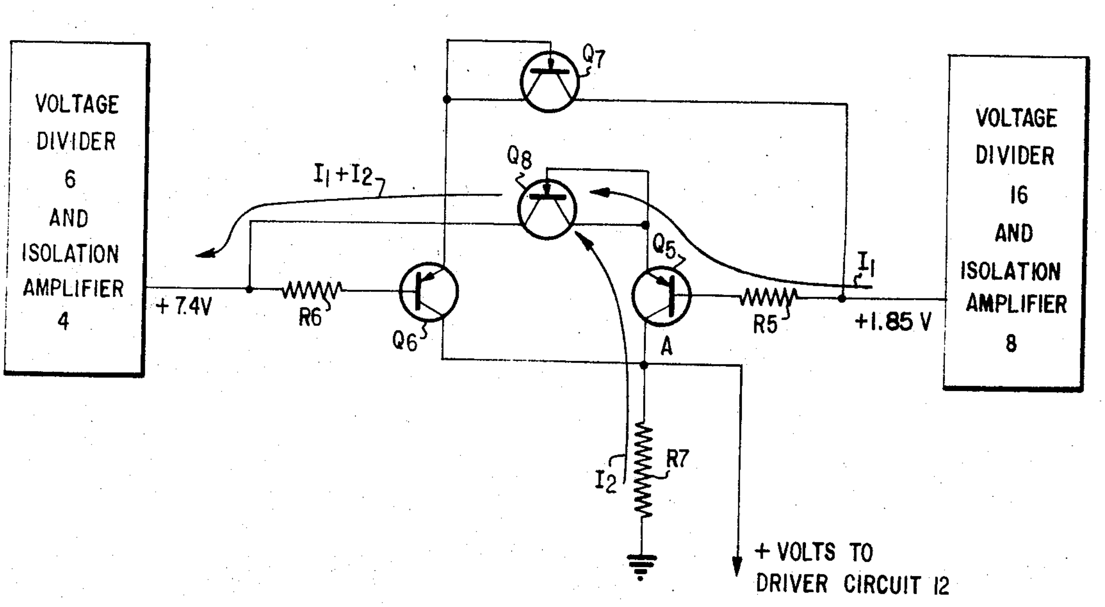
FIG. 3 shows the comparator circuit and its operation when the voltage at the master side of the circuit is greater than the voltage on the slaved side.

FIG. 3 shows the condition which exists when the master switch has been rotated to a position corresponding to an output which is more positive than the voltage on contact 15 of slave switch 14. Under these conditions, transistors $Q_5$ and $Q_8$ are turned on while transistors $Q_6$ and $Q_7$ are held in their off condition. This results in a current $I_1$ through the base-emitter junction of transistor $Q_5$ as well as a current $I_2$ through resistor $R_7$. The current $I_2$ through $R_7$ causes a positive voltage to be developed across $R_7$ and applied to the driver circuit 12. The switch driver circuit 12 and its operation will be discussed below.

Figure 4:
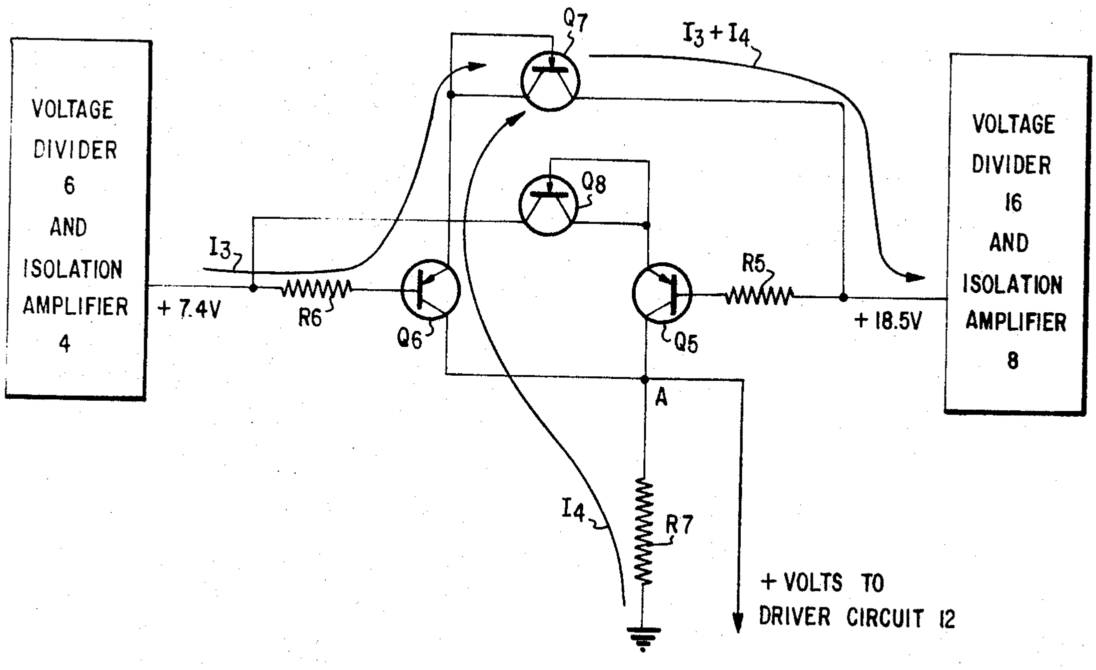
FIG. 4 shows the comparator circuit and its operation when the voltage at the master side is less than the voltage at the slaved side.

When the potential at the output of isolation amplifier 4 is less than the potential at the output of isolation amplifier 8, the circuit operates as shown in FIG. 4. In this case, transistors $Q_6$ and $Q_7$ are turned on while transistors $Q_5$ and $Q_8$ are turned off. This causes current $I_3$ to flow through the base emitter junction of $Q_6$ and a current $I_4$ through transistors $Q_6$ and $Q_7$. The flow of current $I_4$ results in a positive potential being applied across resistor $R_7$ which results in a positive potential being applied to the switch driver circuit 12.

In the preferred embodiment, each of the transistors $Q_5$ and $Q_6$ is a PNP silicon transistor having a collector breakdown rating of at least 40 volts and DC current gain of 40 or more. Transistors $Q_7$ and $Q_8$ are field effect transistors connected for constant current operation. The function of the field effect transistor is to provide circuit protection in the event of a malfunction which would present a large voltage difference across the comparator circuit for any extended period of time. This could happen if the solenoid or mechanical switching mechanism jammed. The field effect transistors limit the maximum current to a safe level without disturbing the normal operation of the circuit. With the use of the comparator circuit just described, a single control wire is all that is needed to force the slave switch to the same relative position as the master switch.

Figure 5:
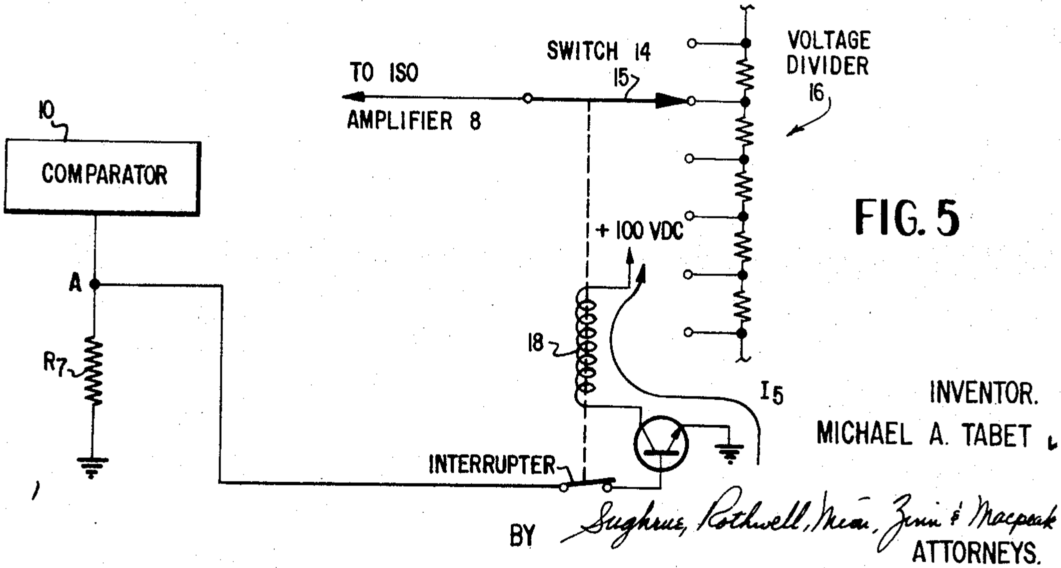
FIG. 5 is a schematic diagram of a solenoid driver circuit for use with the invention.

The voltage across resistor $R_7$ is applied to the driver circuit 12 which as shown in FIG. 5 comprises interrupter contact 20, rotary solenoid 18 and transistor $Q_9$. The potential across resistor $R_7$ turns transistor $Q_9$ on and, as is shown, causes current $I_5$ to flow through solenoid 18. As the solenoid is activated, it advances the switch shaft one position while, at the same time, opens the interrupter contact 20 at the end of its rotation. Solenoid activated stepping switches as well as rotary solenoids which may be used with this invention are wellknown in the art and are therefore not described in detail. Opening of the contact 20 is accomplished by a cam mechanism (not shown) attached to the solenoid. When the interrupter contact opens, the solenoid is de-energized and returns to its relaxed position under the influence of a return spring. With the solenoid de-energized and in its relaxed position, the interrupter contact, no longer under the influence of the cam, closes. If a positive voltage still appears on the output of resistance $R_7$, the transistor $Q_4$ again turns on and repeats the same action. Consequently, the slave switch shaft advances one step at a time until it reaches a position which corresponds to the position of the master switch. At that point, the voltage across $R_7$ will return to 0 thereby deactivating the driver circuit 12.

Though the invention has been described with reference to two identical voltage dividers, it is obvious to those with ordinary skill in the art that the teachings of the invention apply equally well to the situation where unequal voltage dividers are used.

While the invention has been particularly shown and described with reference to a preferred embodiment thereof, it will be understood by those skilled in the art that the foregoing changes in form and detail may be made therein without departing from the spirit and scope of the invention.

WHAT IS CLAIMED IS:

1. A master-salve switching apparatus comprising:
   a. a master switch having a first plurality of positions,
   b. a slave switch having a second plurality of positions corresponding to said first plurality of positions,
   c. first means connected to said master switch for producing a first plurality of electrical quantities each related to a different position of said master switch,
   d. second means connected to said slave switch for producing a second plurality of electrical quantities corresponding to said first plurality, each related to a different position of said slave switch,
   e. a single control conductor connecting said master switch to said slave switch, and
   f. means, coupled to said single conductor and said slave switch, for causing the position of the slave switch to change until it corresponds to the position of the master switch, said means for causing position change comprising,
      i. comparator means including first and second transistors, each having control and first and second electrodes, said master and slave switches being connected respectively to the control electrode of said first and second transistors, the electrical signal at each of said control electrodes representing the position of the switch to which it is coupled, said first electrodes being interconnected to provide an output terminal, the second electrodes of said first and second transistors being connected respectively to the control electrode of said second and first transistors, first and second field effect transistors connected respectively between the control electrode of said first transistor and the second electrode of said second transistor and between the control electrode of said second transistor and the second electrode of said first transistor,
      ii. drive means coupled to said output terminal for intermittently driving said slave switch to a position corresponding to the position of the master switch in response to non-correspondence between master and slave switch positions.

2. The apparatus of the claim 1 further comprising first and second isolating amplifiers connected respectively to said master and slave switches for presenting a high impedance load to said first and second means for producing a plurality of electrical quantitites and a low impedance source to said comparator means.

3. The apparatus of claim 2 wherein said drive means comprises
   a. a solenoid connected to said slave switch,
   b. a transistor circuit for energizing said solenoid,
   c. a normally closed interrupter contact coupled between said output terminal and said transistor circuit, and
   d. means responsive to the energization of the solenoid for opening said interrupter contact at a substantially constant time after energization of said solenoid.

4. The apparatus of claim 3 further comprising a multiplicity of pairs of master and slave switches and corresponding comparator and drive means, each of said pairs of switches being interconnected by a single control conductor, each of said master and slave switches being connected respectively to said first and second means for producing a plurality of electrical quantities.

* * * * *